UNITED STATES PATENT OFFICE.

DANIEL C. FISCHEL, OF TROY, NEW YORK, ASSIGNOR TO HIMSELF AND MAX SINSHEIMER, OF SAME PLACE.

ARTIFICIAL FUEL.

SPECIFICATION forming part of Letters Patent No. 413,110, dated October 15, 1889.

Application filed July 16, 1889. Serial No. 317,730. (Specimens.)

*To all whom it may concern:*

Be it known that I, DANIEL C. FISCHEL, a citizen of the United States, residing at Troy, in the county of Rensselaer and State of New York, have invented certain new and useful Improvements in Artificial Fuel, which I term "Coaline," of which the following is a specification.

This invention relates to a composition of matter in which vegetable refuse or garbage is an ingredient, whereby such matter may be utilized as fuel.

The invention consists in a composition of matter composed of vegetable refuse or garbage, coal-tar, coal-dust, charcoal, oyster or clam shells, and furnace-slag. The coal-dust and charcoal produce the heat necessary for combustion, the charcoal facilitating the ignition of the compound. The coal-tar assists in the production of the heat, and also serves as a cement for the different ingredients of the composition. The furnace-slag acts as a retainer of the heat, and the oyster or clam shells produce oxide of lime and oxide of magnesia, which neutralize the carbonic-acid gas contained in the vegetable refuse and counteract its poisonous effects.

In carrying out my invention I combine the ingredients in the proportions substantially as follows: vegetable refuse, thirty-five pounds; coal-tar, five pounds; charcoal, ten pounds; coal-dust, ten pounds; furnace-slag, thirty pounds; oyster or clam shells, ten pounds.

The foregoing proportions may be varied somewhat without departing from the spirit of my invention.

I claim—

1. An artificial fuel composed of vegetable refuse, coal-tar, charcoal, coal-dust, furnace-slag, and oyster or clam shells, substantially as set forth.

2. An artificial fuel composed of vegetable refuse, thirty-five parts; coal-tar, five parts; charcoal, ten parts; coal-dust, ten parts; furnace-slag, thirty parts, and oyster or clam shells, ten parts.

DANIEL C. FISCHEL.

Witnesses:
GEORGE C. LECONTE,
JOHN T. NORTON.